Aug. 7, 1956     H. C. JOHNSTON     2,757,628
METHOD OF MAKING A MULTIPLE PASSAGE HEAT EXCHANGER TUBE
Filed Sept. 17, 1952     2 Sheets-Sheet 1
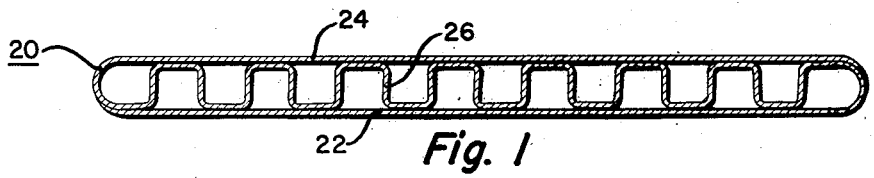
Fig. 1
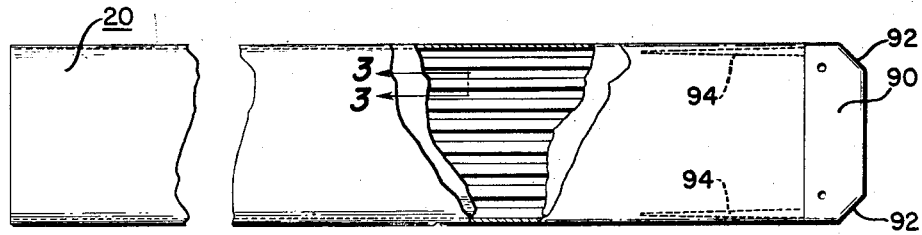
Fig. 2
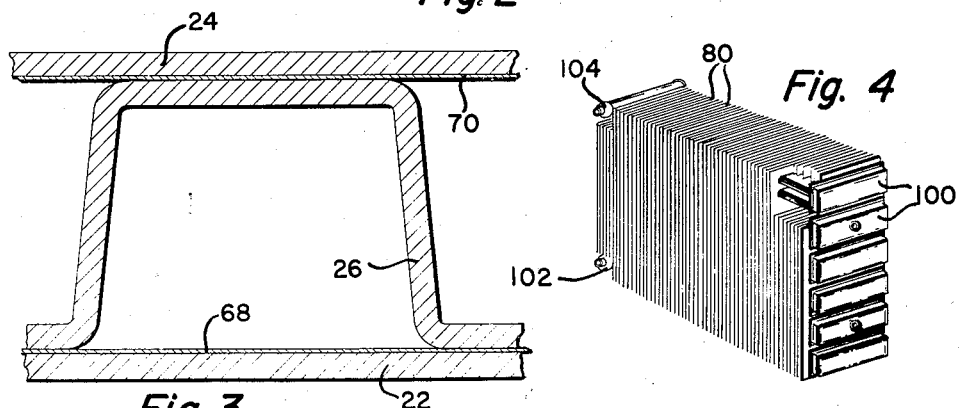
Fig. 3
Fig. 4
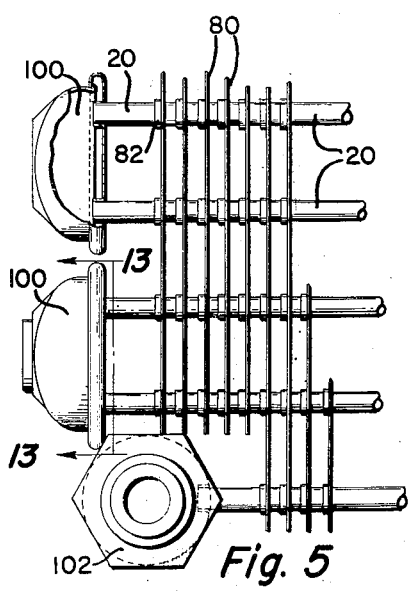
Fig. 5
Fig. 6
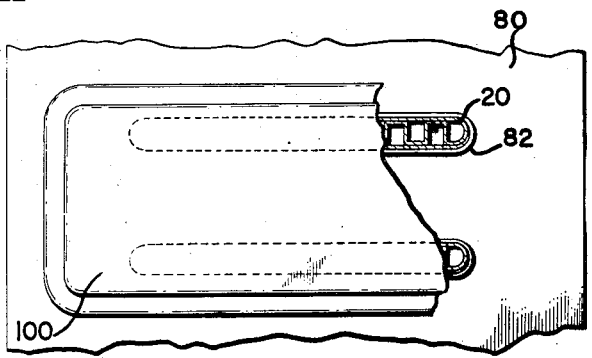
INVENTOR.
Hal C. Johnston.
BY Willits, Hardman & Fehr.

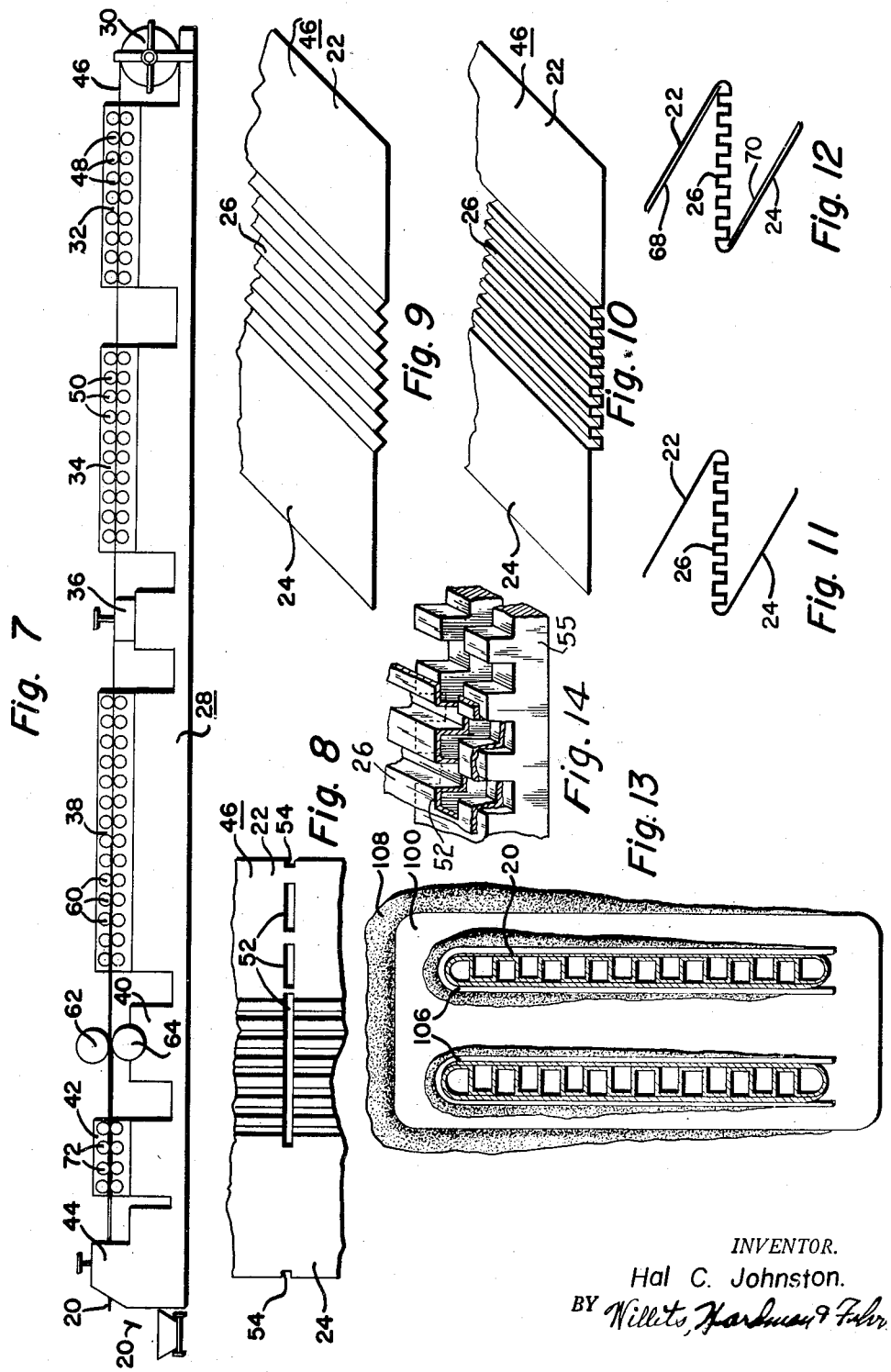

United States Patent Office 2,757,628
Patented Aug. 7, 1956

2,757,628

METHOD OF MAKING A MULTIPLE PASSAGE HEAT EXCHANGER TUBE

Hal C. Johnston, Dayton, Ohio, assignor to General Motors Corporation, Dayton, Ohio, a corporation of Delaware Application September 17, 1952, Serial No. 309,996

4 Claims. (Cl. 113—118)

This invention relates to refrigerating apparatus and more particularly to an improved heat exchanger and to the method of manufacturing the same.

One object of this invention is to reduce the cost of manufacturing tubing for use in high pressure condensers and the like.

It is an object of this invention to provide a low cost heat exchanger comprising a plurality of relatively flat multiple passage tube sections.

Another object of this invention is to provide an improved method of manufacturing multiple passage tubing which eliminates the need for repeated manul handling of the material from which the tubing is made during the process of manufacturing the tubing.

Still another object of this invention is to provide an improved method and arrangement for manufacturing heat exchangers which makes it possible to fuse all of the joints in each heat exchanger in one operation.

A further object of this invention is to provide an improved arrangement for supplying bonding material to a multiplicity of joints in such a manner that an adequate amount of bonding material is provided throughout all of the joints to be bonded.

Still another object of this invention is to provide an improved method of severing multiple passage tubing.

Further objects and advantages of the present invention will be apparent from the following description, reference being had to the accompanying drawings, wherein a preferred form of the present invention is clearly shown.

In the drawings:

Figure 1 is a vertical sectional view showing a section of multiple passage tubing constructed in accordance with this invention;

Figure 2 is a plan view with parts broken away showing a section of multiple passage tubing and a tool for use in threading the tubing through a series of aligned fins;

Figure 3 is a fragmentary sectional view on an enlarged scale taken substantially on line 3—3 of Figure 2;

Figure 4 is a perspective view with parts broken away showing a preferred embodiment of this invention;

Figure 5 is a fragmentary side elevational view showing the relationship between the multiple passage tubing, the return bends, the fins, and one of the headers;

Figure 6 is a fragmentary end elevational view with parts broken away showing the relationship between one of the return bends and the associated multiple passage tubes;

Figure 7 is a side elevational view largely schematic showing the machine used in manufacturing sections of multiple passage tubing;

Figure 8 is a fragmentary plan view showing the shape of the slot which is cut in the strip material used in forming the multiple passage tubing;

Figures 9 and 10 are fragmentary perspective views showing the raw stock in various stages of fabrication;

Figure 11 is a sectional view showing the construction and arrangement of the strip material just prior to the insertion of the bonding material;

Figure 12 is a view similar to Figure 11 but showing the bonding material in place;

Figure 13 is a fragmentary sectional view showing the manner in which the brazing material is applied to some of the joints before the final brazing operation; and Figure 14 is a fragmentary perspective view showing the die used in cutting a slot in the metal strip.

Referring now to the drawing wherein a preferred embodiment of the invention has been shown, reference numeral 20 generally designates relatively flat multiple passage tubing constructed in accordance with the invention. As best shown in Figure 1, this tubing comprises a pair of side walls 22 and 24 which are held in proper spaced relationship by means of an intermediate corrugated portion 26 which divides the tubing into a multiplicity of parallel passages.

Generally speaking, the multiple passage tubing shown in Figure 1 is made from a single strip of relatively wide sheet material which is fed into a special tube forming machine such as the machine 28 shown in Figure 7. The sheet material is fed into the machine from a roll which has been designated by the reference numeral 30. The machine 28 may be considered as having seven stations which, for the sake of convenience, have been designated by the reference numerals 32, 34, 36, 38, 40, 42 and 44.

In manufacturing the multiple passage tubing a flat strip of steel 46 or other suitable material is fed from the supply roll 30 into the first station 32 which consists of a plurality of forming rolls 48 which progressively form a plurality of corrugations 26 which are V-shaped as they leave the station 32 as shown in Figure 9 of the drawing. These corrugations are formed in the central portion of the strip 46 so as to leave flat portions 22a' and 24a on opposite sides of the corrugations. As this corrugated strip leaves the rollers 48 in the station 32 they pass through a second series of forming rollers 50 in station 34. These rollers serve to change the shape of the corrugations from that shown in Figure 9 to that shown in Figure 10. The strip material leaving station 34 then passes to the station 36 which serves to punch slots 52 in the strip. As indicated in Figure 8 of the drawing these slots are so arranged that the strip is completely severed throughout the central corrugated area and largely severed throughout the flange 22 but left substantially intact throughout the flange 24. Notches 54 are cut at both edges of the strip as shown. It has been found that by cutting the slots 52 and the notches 54 at this particular point in the process it is possible to make the cuts without crushing any of the corrugations as it is possible to support the entire underside of the strip by means of a solid die 55 having a top surface corresponding to the bottom surface of the strip 46 as shown in Figure 14 of the drawing. After the slots have been cut in the strip, the strip passes to the station designated by the reference numeral 38 wherein another series of rollers 60 chamfer the edges of the strip and partially bend the edges of the strip over onto the corrugations 26 until the strip assumes the shape shown in Figure 11. The station 40 consists of a pair of rolls 62 and 64 of thin ribbons of bonding or brazing material 68 and 70 which are fed in between the flanges 22 and 24 (see Figure 12) before these flanges are finally bent down onto the corrugated portion 26. The final bending operation is done by means of the rollers 72 provided at the station 42. After the edge portions 22 and 24 have been bent into overlapping relationship with the corrugations they pass to the station 44 which makes a final cut which severs the tubing into a series of short sections such as the section shown in Figure 2.

The sections thus formed are now ready for insertion into a series of pre-slotted fins which have been designated by the reference character 80. The fins 80 are provided with integral flange portions 82 adjacent the slots as best shown in Figures 5 and 6 so as to provide an appreciable area of contact between the fins and the outer walls of the tubing.

In order to facilitate feeding the sections of tubing through the fins, a tool 90 (see Figure 2) is used which has its forward corners 92 chamfered so as to facilitate feeding the tubing through the slots in the fins. The tool 90 is provided with a pair of tapered spike-like elements 94 which are inserted into the end passages as shown in Figure 2 so as to hold the tool in proper alignment with the tube section 20.

After the tube sections have been inserted into the fins, return bends or caps 100 are assembled onto the ends of the tubes as best shown in Figures 4, 5 and 6. Headers 102 and 104 are attached to the ends of the first and last tube sections of the heat exchanger. After the elements have been assembled as hereinabove described and, as shown in Figures 4 and 5, additional bonding material may be added externally at strategic points as found necessary. Thus, as shown in Figure 13, hairpin-shaped wires 106 of bonding material are hung over the ends of the tube sections 20 immediately adjacent the return bends or caps 100 so as to provide the necessary additional bonding material for the joints between the return bends and the ends of the tubes. In addition to the wires 106, additional bonding and fluxing material 108 may be poured onto various joints of the assembly as best shown in Figure 13. After the parts have been thus assembled and the necessary bonding material has been added as needed the entire assembly is placed on a conveyer (not shown) which carries the assembly through a furnace (not shown) which serves to melt the bonded material and cause the same to flow by capillary action into all of the seams in accordance with well known practice.

The material used in making the heat exchangers may be steel or some suitable alloy such as commonly used in making heat exchangers. The bonding material may be conventional brazing material which will flow by capillary action into the seams and produce brazed joints wherever necessary.

By virtue of the above described method and apparatus it is obvious that the inherent resiliency of the strip material used in making the tubing serves to hold the fins, return bends and headers, in proper assembled relationship during the brazing or bonding operation with the result that no special jigs or other fixture need be used. It is also obvious that once the strip 46 is inserted into the machine 28 it need not be handled by anyone until the properly formed sections 20 are discharged from the outlet end of the machine 28.

While the form of embodiment of the invention as herein disclosed constitutes a preferred form, it is to be understood that other forms might be adopted, as may come within the scope of the claims which follow.

What is claimed is as follows:

1. The method of forming multiple passage heat exchange units which comprises forming corrugations in the mid-portion of a sheet metal strip, punching out elongated pieces of material from said strip to form transversely extending slots traversing said corrugations and the major portion of an adjacent margin of said strip, inserting bonding material on opposite sides of said corrugations, bending the opposite edge portions over onto said corrugated portions, completely severing said strip at said slots to form a plurality of sections of multiple passage tubing blanks, threading a plurality of said sections through slots in a plurality of fins, placing return bend elements on the ends of said sections, and thereafter heating the assembly to a temperature high enough to fuse said bonding material so as to bond the overlapping margins of said strips to said corrugations and to said fins.

2. The method of forming multiple passage tubing which comprises forming longitudinally extending corrugations in one portion of a strip, supporting the under side of said strip by means of a solid die having a top surface corresponding to the bottom corrugated surface of said strip and while thus supported cutting slots in said strip crosswise of said corrugations at predetermined spaced intervals, placing bonding material at opposite sides of said corrugations, bending the flat portions of said strip in overlapping relationship to said corrugations, thereafter completely severing said strip at said slots and heating said bonding material to a temperature high enough to bond said overlapping portions to the peaks of said corrugations.

3. The method of forming multiple passage tubing which comprises forming longitudinally extending corrugations in one portion of a strip, punching out elongated pieces of material from said strip to form slots in said strip crosswise of said corrugations at predetermined spaced intervals, bending the flat portions of said strip in overlapping relationship to said corrugations, and thereafter completely severing said strip at said slots.

4. The method of forming multiple passage tubing by the continuous strip method which comprises forming corrugations in one portion of a strip, supporting the under side of said strip by means of a solid die having a top surface corresponding to the bottom corrugated surface of said strip and while thus supported cutting slots in said strip crosswise of said corrugations at predetermined spaced intervals, placing ribbon like strips of bonding material at opposite sides of said corrugations, bending the flat portions of said strip in overlapping relationship to said corrugations so as to hold said bonding strips in place, completely severing said strip at said slots so as to form a plurality of sections of tubing, and heating said sections so as to fuse said bonding material.

References Cited in the file of this patent

UNITED STATES PATENTS

| | | |
|---|---|---|
| 2,127,618 | Riemenschneider | Aug. 23, 1938 |
| 2,232,562 | Sandberg | Feb. 18, 1941 |
| 2,267,315 | Stikeleather | Dec. 23, 1941 |
| 2,373,218 | Arnold | Apr. 10, 1945 |
| 2,444,463 | Nordquist | July 6, 1948 |